(12) United States Patent
Staveley

(10) Patent No.: US 11,010,735 B2
(45) Date of Patent: May 18, 2021

(54) METHOD AND SYSTEM FOR EFFECTING A PAYMENT TRANSACTION

(71) Applicant: MasterCard International Incorporated, Purchase, NY (US)

(72) Inventor: Alex Staveley, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 873 days.

(21) Appl. No.: 15/346,070

(22) Filed: Nov. 8, 2016

(65) Prior Publication Data

US 2017/0147997 A1 May 25, 2017

(30) Foreign Application Priority Data

Nov. 20, 2015 (EP) .................................. 15195586

(51) Int. Cl.
*G06Q 30/00* (2012.01)
*G06Q 20/10* (2012.01)
*G06Q 20/42* (2012.01)
*G06Q 20/32* (2012.01)
*G06Q 30/02* (2012.01)
*H04L 29/08* (2006.01)

(52) U.S. Cl.
CPC ....... *G06Q 20/102* (2013.01); *G06Q 20/3223* (2013.01); *G06Q 20/3276* (2013.01); *G06Q 20/42* (2013.01); *G06Q 30/0283* (2013.01); *H04L 67/02* (2013.01); *G06Q 2220/00* (2013.01)

(58) Field of Classification Search
CPC .................................................... G06Q 20/102
USPC ............ 705/40, 1.1; 382/181, 309, 321, 135
See application file for complete search history.

(56) References Cited

U.S. PATENT DOCUMENTS

| 8,805,125 B1* | 8/2014 | Kumar | G06K 9/00469 |
| | | | 382/309 |
| 9,990,621 B1* | 6/2018 | Ng | G06Q 20/202 |
| 2013/0218757 A1* | 8/2013 | Ramanathan | G06Q 20/3276 |
| | | | 705/39 |

OTHER PUBLICATIONS

NPL Search History.*

* cited by examiner

*Primary Examiner* — John H. Holly
(74) *Attorney, Agent, or Firm* — Buchanan Ingersoll & Rooney PC

(57) ABSTRACT

Provided are a method and system for effecting a payment transaction. The method capturing a digital image of a price identifier and a merchant identifier at a client device. Generating payment request data by a payer application at the client device comprising data corresponding to the price and merchant identifiers contained in the digital image. Forwarding the payment request data from the payer application to a payment server. Initiating by the payment server a payment transaction from a payer account to a recipient account in response to receipt of the payment request data. Forwarding notification data to the payer application indicating the status of the payment transaction from the payment server.

13 Claims, 3 Drawing Sheets

METHOD AND SYSTEM FOR EFFECTING A PAYMENT TRANSACTION

FIELD OF THE INVENTION

The present disclosure relates to a method and system for effecting a payment transaction. More particularly, but not exclusively, it relates to a method and system for effecting payment transaction in response to a payment request containing a digital image.

BACKGROUND OF THE DISCLOSURE

The task of paying for items at a point-of-sale terminal may be time consuming. For example, the task of obtaining and paying for fuel at a filling station often results in delays at the point-of-sale terminal. Typically, drivers are required to initially wait in line at the filling station until a fuel dispenser becomes available. Once the fuel has been dispensed it is usually necessary to queue to pay for the fuel at a separate pay station which may result in further delays. This is undesirable.

There is therefore a need for a method and system for effecting a payment transaction which addresses at least some of the drawbacks of the prior art.

SUMMARY OF THE INVENTION

In accordance with an aspect of the present invention; there is provided a computer-implemented method of effecting a payment transaction, the method comprising:

capturing a digital image of a price identifier and a merchant identifier at a client device;

generating payment request data by a payer application at the client device comprising data corresponding to the price and merchant identifiers contained in the digital image;

forwarding the payment request data from the payer application to a payment server;

initiating by the payment server a payment transaction from a payer account to a recipient account in response to receipt of the payment request data; and forwarding notification data to the payer application indicating the status of the payment transaction from the payment server.

In one embodiment, the price identifier is associated with a monetary value.

In another embodiment, the merchant identifier is associated with the recipient account.

In one embodiment, the payment request data includes an identifier associated with the payer account.

In another embodiment, the payer application is configured to generate an encrypted binary representation of the digital image. Advantageously, the payer application is configured to relay the payment request data to the payment server using a secure hypertext transfer protocol (HTTPS).

In another embodiment, the payment server is configured to decrypt the binary image.

In one embodiment, the payment server is operable to extract the price identifier and the merchant identifier from the payment request data.

In another embodiment, the payment server is configured to use image recognition in order to extract the price identifier and the merchant identifier.

In an exemplary embodiment, the payment server sends confirmation request data to the payer application prior to initiating the payment transaction.

In one embodiment, the payment server initiates the payment transaction after receipt confirmation data is received from the payer application.

In another embodiment, the merchant identifier includes a machine readable code. Advantageously, the machine readable code comprises a bar code. In one example, the machine readable code comprises a quick response (QR) code.

In one embodiment, a database is provided.

In another embodiment, the database is accessible by the payment server.

In one embodiment, the database comprises particulars associated with the payer.

In a further embodiment, the database comprises particulars associated with the merchant.

In accordance with another aspect of the invention, a computer-readable medium is provided comprising non-transitory instructions which, when executed, cause a processor to effect a payment transaction, the method comprising:

capturing a digital image of a price identifier and a merchant identifier at a client device;

generating payment request data by a payer application at the client device comprising data corresponding to the price and merchant identifiers contained in the digital image;

forwarding the payment request data from the payer application to a payment server;

initiating by the payment server a payment transaction from a payer account to a recipient account in response to receipt of the payment request data; and forwarding notification data to the payer application indicating the status of the payment transaction from the payment server.

In a further aspect of the invention there is provided a system for effecting a payment transaction; the system comprising one or more modules which are configured to capture a digital image of a price identifier and a merchant identifier at a client device;

generate payment request data by a payer application at the client device comprising data corresponding to the price and merchant identifiers contained in the digital image;

forward the payment request data from the payer application to a payment server;

initiate by the payment server a payment transaction from a payer account to a recipient account in response to receipt of the payment request data; and forward notification data to the payer application indicating the status of the payment transaction from the payment server.

In one aspect of the invention there is provided a client device being co-operable with a payment server for effecting a payment transaction; the client device comprising one or more modules which are configured to capture a digital image of a price identifier and a merchant identifier;

generating payment request data by a payer application comprising data corresponding to the price and merchant identifiers contained in the digital image;

forward the payment request data from the payer application to the payment server which initiates a payment transaction from a payer account to a recipient account; and receive notification data by the payer application from the payment server indicating the status of the payment transaction.

In another aspect of the invention there is provided a payment server being co-operable with a client device for effecting a payment transaction; the payment server comprising one or more modules which are configured to receive payment request data from a payer application on the client device containing a price identifier and a merchant identifier derived from a digital image;

initiate a payment transaction from a payer account to a recipient account in response to receipt of the payment request data; and forward notification data to the payer application indicating the status of the payment transaction.

BRIEF DESCRIPTION OF THE DRAWINGS

Embodiments of the present invention will now be described, by way of example only, with reference to the accompanying drawings, in which.

DESCRIPTION OF THE PREFERRED EMBODIMENT

Embodiments of the present invention will now be described with reference to an exemplary system for effecting a payment transaction. It will be understood that the exemplary system is provided to assist in an understanding of the present teaching and is not to be construed as limiting in any fashion. Furthermore, modules or elements that are described with reference to any one Figure may be interchanged with those of other Figures or other equivalent elements without departing from the spirit of the present teaching.

Figure 1:
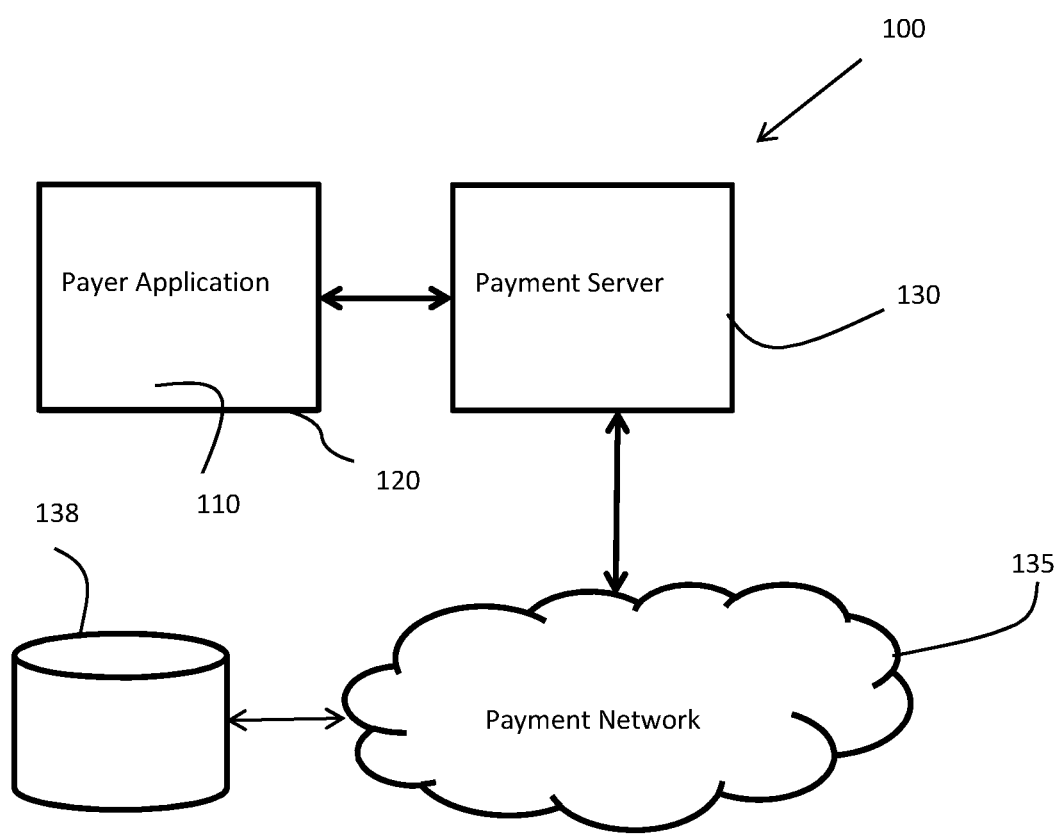
FIG. 1 is a diagram of a system which is configured for effecting a payment transaction.

Referring to the drawings and, in particular to FIG. 1, an exemplary system 100 for processing a payment transaction is illustrated. The system 100 facilitates payment for items using an on-line platform thereby removing the need for the user to make payment on a point-of-sale terminal. It will be appreciated that in the following, the term account is intended to include bank accounts, credit accounts, deposit accounts, checking accounts and the like. The system 100 comprises a payer application 110 which is accessible via a computing device 120. The computing device 120 may be a smart phone, computing tablet, or any other suitable computing device. The payer application 110 is co-operable a digital camera of the computing device 120 which allows a user to photograph an identifier associated with a merchant and an price identifier associated with a item that the merchant sells.

The price of the item and the merchant identifier is visually displayed. The user logs into the payer application 110 and takes a digital image of the price and the merchant identifier. The payer application 110 is configured to generate an encrypted binary representation of the image which is relayed to a payment server 130 over HTTPS. The payment server 130 is operable to decrypt the binary image. The payment server 130 uses image recognition to determine the price of the item and the identity of the merchant by extracting the information from the digitally captured image. The payment server 130 sends a confirmation request message to the user's computer device 120 requesting the user to confirm that a payment should be authorised. For example, the message may indicate that "you are about to pay merchant XYZ an amount of € 50, please confirm". The payment server 130 may also present payment options that the user can use by utilising a digital wallet. The payment server 130 executes payment and notifies the merchant account that payment has occurred.

In the exemplary embodiment the payment transaction is described with reference to paying for fuel at a filling station. However, it is not intended to limit the present teaching to a particular type of payment transaction. For example, the merchant may be a filling station and the price may represent a monetary value of the amount of fuel dispensed at the filling station. The payer application 110 may be activated on the computing device 120 at a fuel station so that the user can authorise payment for the dispensed fuel using the digitally captured image which contains the merchant identifier and the monetary value of the dispensed fuel.

A payment request is generated on the payment server 130 in response to the digitally captured image being received from the computing device 120. The payment request includes an identifier associated with a payer account from which payment is authorised.

The user activates the fuel dispenser in order to dispense a volume of fuel into a vehicle. The fuel dispenser is configured to generate a record of the fuel which is dispensed. The user takes a digital photograph of the value of the dispensed fuel together with a merchant identifier which is displayed at the fuel dispenser. The payment application 110 generates a payment request which includes a photograph of the value of dispensed fuel and the merchant identifier. The payment request may also include an account identifier for the user which is supplied during a registration process when the user registers with the system 100. The payment server 130 receives the payment order from the payment application 120. The payment server 130 generates a payment request message which includes the identifier of the payer account, an identifier associated with a recipient account, and the value of the fuel which was dispensed at the fuel dispenser. The payment server 130 then forwards the payment request message to a payment network 135 which is operable to effect a payment transaction such that a value corresponding to the monetary value of the dispensed fuel is transferred from the payer account to the recipient account. Upon completing the payment transaction the payment network 135 generates a notification which details the status of the payment transaction. The notification is then forwarded from the payment network 135 to the payer application 110, either via the payment server 130 or directly via a data connection, for display on the computing device 120.

It will be appreciated that the system 100 includes one or more software modules which are programmed to implement predefined functions. The payer application 110 may be either a mobile or a web application. A central database 138 is connected to the payment network 135 to process the payment request message. The central database 138 contains the payer's details (credit card number, username, password, etc.), the merchant's details (location, special offers, price, opening times, etc.) and the payments details as well. It receives the payment request message and converts it to a card payment and requests the payment on behalf of the merchant over the card payment network.

Figure 2:
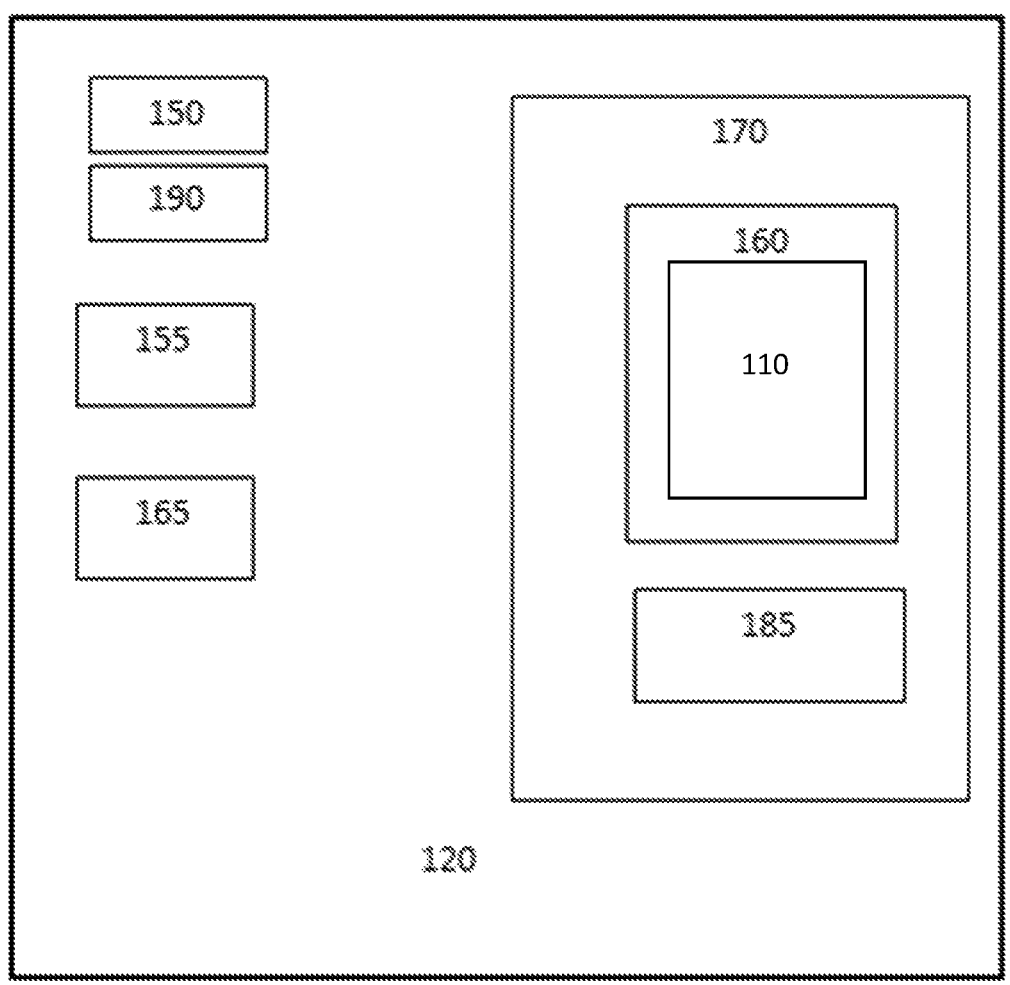
FIG. 2 is a diagram of a computing device which forms part of the system of FIG. 1.

FIG. 2 is a block diagram illustrating a configuration of the computing device 120 which is a smart phone in the exemplary embodiment. The computing device 120 includes various hardware and software components that function to perform the methods according to the present disclosure. The computing device 120 comprises a user interface 150, a processor 155 in communication with a memory 160, and a communication interface 165. The processor 155 functions to execute software instructions that can be loaded and stored in the memory 160. The processor 155 may include a number of processors, a multi-processor core, or some other type of processor, depending on the particular implementation. The memory 160 may be accessible by the processor 155, thereby enabling the processor 155 to receive and execute instructions stored on the memory 160. The memory 160 may be, for example, a random access memory (RAM) or any other suitable volatile or non-volatile computer readable storage medium. In addition, the memory 160 may be fixed or removable and may contain one or more components or devices such as a hard drive, a flash memory, a rewritable optical disk, a rewritable magnetic tape, or some combination of the above.

One or more software modules 170 may be encoded in the memory 160. The software modules 170 may comprise one or more software programs or applications having computer program code or a set of instructions configured to be executed by the processor 155. Such computer program code or instructions for carrying out operations for aspects of the systems and methods disclosed herein may be written in any combination of one or more programming languages.

The software modules 170 may include the payer application 110 and one or more additional applications configured to be executed by the processor 155. During execution of the software modules 170, the processor 155 configures the computing device 120 to perform various operations relating to the effecting payment using digital images according to embodiments of the present disclosure.

Other information and/or data relevant to the operation of the present systems and methods, such as a database 185, may also be stored on the memory 160. The database 185 may contain and/or maintain various data items and elements that are utilized throughout the various operations of the payment application 110. It should be noted that although the database 185 is depicted as being configured locally to the computing device 120, in certain implementations the database 185 and/or various other data elements stored therein may be located remotely. Such elements may be located on a remote device or server—not shown, and connected to the computing device 120 through a network in a manner known to those skilled in the art, in order to be loaded into a processor and executed.

Further, the program code of the software modules 170 and one or more computer readable storage devices (such as the memory 160) form a computer program product that may be manufactured and/or distributed in accordance with the present disclosure, as is known to those of skill in the art.

The communication interface 165 is also operatively connected to the processor 155 and may be any interface that enables communication between the computing device 120 and external devices, machines and/or elements including the payment server 130. The communication interface 165 is configured for transmitting and/or receiving data. For example, the communication interface 165 may include but is not limited to a Bluetooth, or cellular transceiver, a satellite communication transmitter/receiver, an optical port and/or any other such, interfaces for wirelessly connecting the computing device 120 to the payment server 130.

The user interface 150 is also operatively connected to the processor 155. The user interface may comprise one or more input device(s) such as switch(es), button(s), key(s), and a touchscreen. The user interface 150 functions to allow the entry of data. The user interface 150 functions to facilitate the capture of commands from the user such as an on-off commands or settings related to operation of the above-described method.

A display 190 may also be operatively connected to the processor 155. The display 190 may include a screen or any other such presentation device that enables the user to view various options, parameters, and results, such as the group identifiers. The display 190 may be a digital display such as an LED display. The user interface 150 and the display 190 may be integrated into a touch screen display. The operation of the computing device 120 and the various elements and components described above will be understood by those skilled in the art with reference to the method and system for authorising a payment transaction.

It will be understood that what has been described herein is an exemplary system 100 for effecting a payment transaction. While the present disclosure has been described with reference to exemplary arrangements it will be understood that it is not intended to limit the disclosure to such arrangements as modifications can be made without departing from the spirit and scope of the present teaching. The method of the present teaching may be implemented in software, firmware, hardware, or a combination thereof. In one mode, the method is implemented in software, as an executable program, and is executed by one or more special or general purpose digital computer(s). The steps of the method may be implemented by a server or computer in which the software modules reside or partially reside.

Generally, in terms of hardware architecture, such a computer will include, as will be well understood by the person skilled in the art, a processor, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the other computer components.

It will be appreciated that the system 100 may be implemented using cloud or local server architecture. In this way it will be understood that the present teaching is to be limited only insofar as is deemed necessary in the light of the appended claims.

Figure 3:
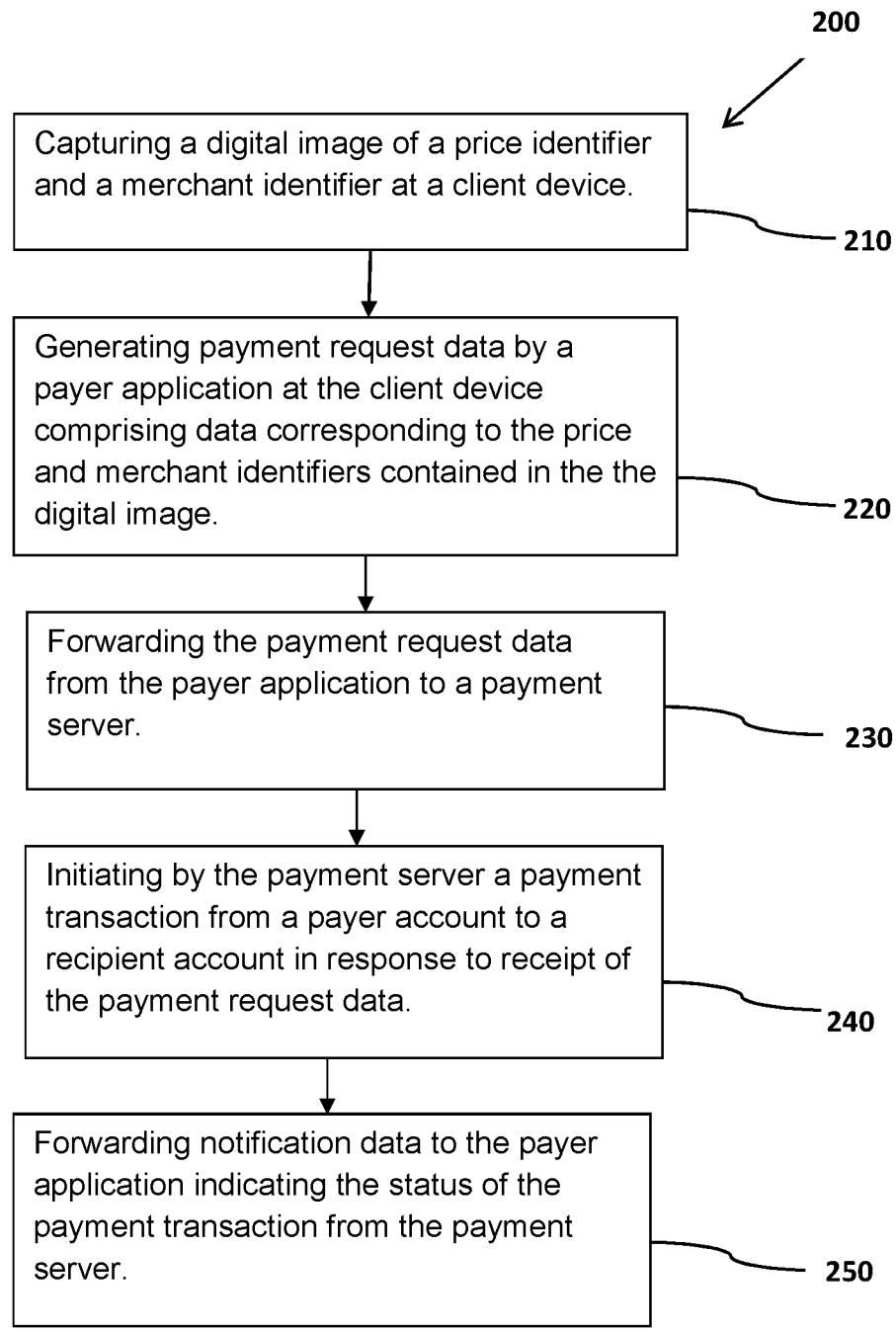
FIG. 3 is a flow chart illustrating exemplary step for effecting a payment transaction.

The flow chart 200 of FIG. 3 illustrates exemplary steps for effecting payment transaction in accordance with the present teaching. The method may comprise capturing a digital image of a price identifier and a merchant identifier at a client device 120, step 210. The method may comprise generating payment request data by a payer application 110 at the client device 120 comprising data corresponding to the price and merchant identifiers contained in the digital image, step 220. Furthermore, the method may include forwarding the payment request data from the payer application 110 to a payment server 130, step 230. The method may also include initiating by the payment server 130 a payment transaction from a payer account to a recipient account in response to receipt of the payment request data, step 240. Additionally, the method may include forwarding notification data to the payer application 110 indicating the status of the payment transaction from the payment server 130, step 250.

It should be emphasized that the above-described embodiments of the present teaching, particularly, any "preferred" embodiments, are possible examples of implementations, merely set forth for a clear understanding of the principles. Many variations and modifications may be made to the above-described embodiment(s) without substantially departing from the spirit and principles of the present teaching. All such modifications are intended to be included herein within the scope of this disclosure and the present invention and protected by the following claims. For example, steps associated with the processes described herein can be performed in any order, unless otherwise specified or dictated by the steps themselves. The present disclosure is intended to embrace all such alternatives, modifications and variances that fall within the scope of the appended claims.

Similarly the words comprises/comprising when used in the specification are used to specify the presence of stated features, integers, steps or components but do not preclude the presence or addition of one or more additional features, integers, steps, components or groups thereof.

The invention claimed is:

1. A computer-implemented method of effecting a payment transaction, the method comprising:
   capturing, via a digital camera, a digital image of a price identifier and a merchant identifier at a client device, the captured digital image of the price identifier includes a digital photograph of a value of a product with the merchant identifier;
   generating, via a processor of the client device, an encrypted binary representation of the captured digital image for transmission over Hypertext Transfer Protocol Secure (HTTPS);
   generating, via the processor of the client device, payment request data by a payer application at the client device consisting of an account identifier and the encrypted binary representation of the digital image which includes data corresponding to the price and merchant identifiers contained in the digital image;
   forwarding, via a communication interface, the payment request data from the payer application to a payment server over a network using HTTPS;
   decrypting, via a processor of the payment server, the encrypted binary representation of the digital image to obtain the digital image and extracting the value of the product and an identity of the merchant from the obtained digital image via image recognition;
   initiating, by the processor of the payment server, a payment transaction from a payer account associated with the account identifier to a recipient account in response to receipt of the payment request data by converting the payment request to a card payment associated with the account identifier; and
   forwarding, via an output device of the payment server, notification data to the payer application indicating the status of the payment transaction from the payment server.

2. The method of claim 1, wherein the value of the price identifier is associated with a monetary value; and/or the merchant identifier is associated with the recipient account.

3. The method of claim 1, wherein the payment request data includes an identifier associated with the payer account.

4. The method of claim 1, wherein the payer application is configured to relay the payment request data to the payment server using a secure hypertext transfer protocol.

5. The method of claim 1, wherein the payment server sends confirmation request data to the payer application prior to initiating the payment transaction; and/or wherein the payment server effects payment after a confirmation message is received from the payer application.

6. The method as of claim 1, wherein the merchant identifier includes at least one of a machine readable code; a bar code, or a quick response (QR) code.

7. The method of claim 1, further comprising a database.

8. The method of claim 7, wherein the database is accessible by the payment server.

9. The method of claim 7, wherein the database comprises at least one of: particulars associated with the payer and particulars associated with the merchant.

10. A computer-readable medium comprising non-transitory instructions which, when executed, cause a processor to carry out the method according to claim 1.

11. A system for effecting a payment transaction;
   the system comprising one or more modules which are configured to:
      capture a digital image of a price identifier and a merchant identifier at a client device, the captured digital image includes a digital photograph of a value of a product with the merchant identifier;
      encrypt a binary representation of the captured digital image for transmission over Hypertext Transfer Protocol Secure (HTTPS);
      generate payment request data by a payer application at the client device consisting of an account identifier and a binary representation of the digital image which includes data corresponding to the price and merchant identifiers contained in the digital image;
      forward the payment request data from the payer application to a payment server over a network using HTTPS;
      decrypt the encrypted binary representation of the digital image to obtain the digital image and extracting the value of the product and an identity of the merchant from the obtained digital image via image recognition;
      initiate by the payment server a payment transaction from a payer account associated with the account identifier to a recipient account in response to receipt of the payment request data by converting the payment request to a card payment associated with the account identifier; and
      forward notification data to the payer application indicating the status of the payment transaction from the payment server.

12. A client device being co-operable with a payment server for effecting a payment transaction, the client device comprising:
   one or more modules in combination with a digital camera to capture a digital image of a price identifier and a merchant identifier, the captured digital image includes a digital photograph of a value of a product with the merchant identifier;
   the one or more modules in combination with a processor to generate an encrypted binary representation of the captured digital image for transmission over Hypertext Transfer Protocol Secure (HTTPS);
   the one or more modules in combination with a processor to generate payment request data by a payer application consisting of an account identifier and a binary representation of the digital image which includes data corresponding to the price and merchant identifiers contained in the digital image;
   the one or more modules in combination with a communication interface to forward the payment request data from the payer application to the payment server over a network using HTTPS, the payment request data initiates a payment transaction from a payer account associated with the account identifier to a recipient account by converting the payment request to a card payment associated with the account identifier; and the one or more modules in combination with the communication interface to receive, via the communication interface, notification data by the payer application from the payment server indicating the status of the payment transaction.

13. A payment server being co-operable with a client device for effecting a payment transaction; the payment server comprising one or more modules in combination with at least a processor, an input device, and an output device, the payment server being configured to:

receive, via the input device, payment request data from a payer application on the client device, the payment request data consisting of an account identifier, a price identifier and a merchant identifier derived from a digital image including an encrypted binary representation of a digital photograph of a value of a product with the merchant identifier ;

decrypt, via the processor using Hypertext Transfer Protocol Secure, the encrypted binary representation of the digital image to obtain the digital image and extract the value of the product and an identity of the merchant from the obtained digital image via image recognition;

initiate, via the processor, a payment transaction from a payer account associated with the account identifier to a recipient account in response to receipt of the payment request data by converting the payment request to a card payment associated with the account identifier; and forward, via the output device, notification data to the payer application indicating the status of the payment transaction.

* * * * *